C. L. GLYNN.
SPRING GRIP HOLDER FOR WIRE CORD.
APPLICATION FILED MAR. 24, 1910.

977,384.

Patented Nov. 29, 1910.

Witnesses:
John H. Parker
Aline Tarr

Inventor:
Cyrus L. Glynn
by Macleod, Calver, Copeland & Dike
Attorneys.

UNITED STATES PATENT OFFICE.

CYRUS L. GLYNN, OF BOSTON, MASSACHUSETTS.

SPRING GRIP-HOLDER FOR WIRE CORD.

977,384.  Specification of Letters Patent.  Patented Nov. 29, 1910.

Application filed March 24, 1910. Serial No. 551,405.

*To all whom it may concern:*

Be it known that I, CYRUS L. GLYNN, a citizen of the United States, residing at Boston, in the county of Suffolk and State of Massachusetts, have invented a certain new and useful Improvement in Spring Grip-Holders for Wire Cord, of which the following is a specification, reference being had therein to the accompanying drawings.

The object of the invention is to provide a grip and holder for use with wire, cord, rope or chain or the like whereby the cord may be readily gripped at any point and securely held in such manner that it may also be readily released when desired. It is especially useful in the place of screw-eyes for use in connection with hanging picture frames and the like.

The invention will be fully understood from the following description taken in connection with the accompanying drawings, and the novel features are pointed out and clearly defined in the claim at the close of the specification.

Figure 1:
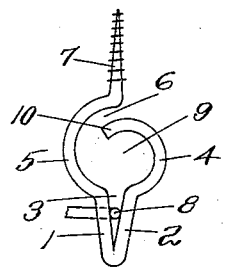
Figure 2:
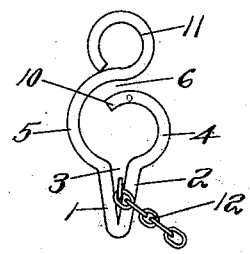

In the drawings,—Figure 1 is a plan of a device illustrating my invention showing a section of cord or wire gripped by the holder. Fig. 2 shows a modified form of construction in which an eye is formed instead of a screw shank as in Fig. 1, and a chain is shown instead of the cord or wire.

Referring to the drawings,—the device is preferably made of a single piece of wire, either round, oval or other shape in cross-section, and bent to the desired form.

As shown in Fig. 1, the wire is bent sharply back upon itself intermediate the ends, forming the two diverging portions 1, 2, between which is thus formed a wedge-shaped slot 3. The branch 2 is formed with a curved portion 4 toward its end, preferably nearly substantially semi-circular in form, and the continuation of the branch 1 is formed with a curved portion 5 on a somewhat larger curve than the portion 4 and lapping past the end of the portion 4, forming a passageway 6 between the end of the curved portion 4 and the end of the curved portion 5. The curved portion 5 terminates in a screw-threaded pointed shank 7, whereby the device may be screwed into a frame or any suitable support. The passage 6 is of sufficient width to enable the cord 8 to be passed broadside through the passage into the eye 9, rather than passing through a closed ring, and thence it will be drawn down into the wedge-shaped slot 3 and pulled down toward the bottom of the slot, being gripped more and more tightly the farther it is pulled down. As the end 10 of the branch arm 2 is free after the shank 7 has been screwed to the support, it allows a yielding movement so that as the cord 8 is pulled down into the slot, the branch 2 will slightly yield to the spreading effect of the cord, but its resiliency will cause it to grip the cord very tightly after the cord has been drawn in as far as desired and will hold it very firmly without the necessity of any winding of the cord or other fastening of the end. When it is desired to release the cord, it is grasped on either side of the slot and can easily be pulled out.

In the form shown in Fig. 2, instead of the screw 7, the end is curled around to form a loop eye portion 11 so that if desired it may be connected with a screw-eye or other fastening so as to make a flexible joint. Instead of the cord 8, a chain 12 is shown as gripped by the device for the purpose of showing the adaptation of the device for gripping any flexible cable or the like.

The device may be used as a grip for wire, cord, rope, chain or other flexible connection. For convenience of designation in the claim the word cord is intended broadly to cover its use with any such articles.

What I claim is:

A grip-holder for cord consisting of a bifurcated piece of metal having a wedge-shaped slot between the two branches, both of said branches being curved outwardly before entrance to the wedge-shaped slot, the concave sides of the bows facing each other, forming an eye, one of said branches being bowed on a larger radius than the other and lapping past the free end of the other substantially parallel therewith whereby a parallel sided narrow passage is formed between the overlapped sides of the two branches, the branch of said larger radius terminating in a portion adapted to be secured to a support, the end of the branch of the smaller diameter being free to spring.

In testimony whereof I affix my signature, in presence of two witnesses.

CYRUS L. GLYNN.

Witnesses:
  WILLIAM A. COPELAND,
  ALICE H. MORRISON.